(12) United States Patent
Soni et al.

(10) Patent No.: US 10,834,211 B2
(45) Date of Patent: *Nov. 10, 2020

(54) BASELINE INTEREST PROFILE FOR RECOMMENDATIONS USING A GEOGRAPHIC LOCATION

(71) Applicant: Oath Inc., New York, NY (US)

(72) Inventors: Akshay Soni, San Jose, CA (US);
Yashar Mehdad, San Jose, CA (US);
Troy Chevalier, San Mateo, CA (US);
Srikanth Nampelli, San Jose, CA (US);
Ashwini Bhatkhande, San Jose, CA (US)

(73) Assignee: Oath, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/558,200

(22) Filed: Sep. 2, 2019

(65) Prior Publication Data
US 2019/0387067 A1 Dec. 19, 2019

Related U.S. Application Data

(63) Continuation of application No. 15/265,777, filed on Sep. 14, 2016, now Pat. No. 10,404,813.

(51) Int. Cl.
*G06F 15/16* (2006.01)
*H04L 29/08* (2006.01)
(Continued)

(52) U.S. Cl.
CPC .......... *H04L 67/18* (2013.01); *G06F 16/9535* (2019.01); *G06N 7/005* (2013.01); *G06N 20/00* (2019.01); *H04L 67/10* (2013.01)

(58) Field of Classification Search
CPC .... G06F 16/9535; G06N 20/00; G06N 7/005; H04L 67/10; H04L 67/18
See application file for complete search history.

(56) References Cited

U.S. PATENT DOCUMENTS 8,024,317 B2 * 9/2011 Nair ....................... G06Q 30/02
707/709
8,060,510 B2 * 11/2011 Ghanekar ............... G06F 16/29
707/736

(Continued)

*Primary Examiner* — Moustafa M Meky
*Assistant Examiner* — Thorne E Waugh
(74) *Attorney, Agent, or Firm* — Cooper Legal Group, LLC

(57) ABSTRACT

Software for a content-aggregation website generates a first representation of interests for a geographical location. The representation includes a plurality of entities that are derived from a corpus of documents. Each of the plurality of entities is associated with an expected value that is based on engagement signals from users in the geographical location and that is weighted using a sparse-polarity approach to be discriminative with respect to other entities. Each of the ingested articles is represented by the second representation that associates an aboutness score with each of the plurality of entities. The software uses the first representation, a similarity measure, and a second representation to create rankings of a plurality of ingested articles received. Then the software receives a request for access to the content-aggregation service from a new user from the geographical location and serves the new or infrequent user a content stream based on the rankings.

20 Claims, 6 Drawing Sheets

(51) Int. Cl.
  *G06F 16/9535* (2019.01)
  *G06N 7/00* (2006.01)
  *G06N 20/00* (2019.01)

(56) References Cited

U.S. PATENT DOCUMENTS

| | | | | |
|---|---|---|---|---|
| 8,442,969 | B2 * | 5/2013 | Gross | G06Q 30/00 |
| | | | | 707/709 |
| 8,762,360 | B2 * | 6/2014 | Jiang | G06F 16/9535 |
| | | | | 707/706 |
| 8,838,584 | B2 * | 9/2014 | Rafsky | G06F 16/9535 |
| | | | | 707/723 |
| 8,954,440 | B1 * | 2/2015 | Gattani | G06F 16/93 |
| | | | | 707/738 |
| 9,679,018 | B1 * | 6/2017 | Yuksel | G06F 16/335 |
| 9,971,775 | B2 * | 5/2018 | Laptev | G06F 16/9537 |
| 2011/0072001 | A1 * | 3/2011 | Basu | G06F 16/9038 |
| | | | | 707/709 |
| 2012/0109966 | A1 * | 5/2012 | Liang | G06F 16/338 |
| | | | | 707/740 |
| 2012/0297278 | A1 * | 11/2012 | Gattani | G06F 16/367 |
| | | | | 715/205 |
| 2013/0080353 | A1 * | 3/2013 | Kovarsky | G06Q 40/06 |
| | | | | 705/36 R |
| 2014/0214790 | A1 * | 7/2014 | Vaish | G06F 16/93 |
| | | | | 707/709 |
| 2014/0304249 | A1 * | 10/2014 | Ayzenshtat | G06F 16/9535 |
| | | | | 707/709 |
| 2015/0339717 | A1 * | 11/2015 | Binas | G06Q 30/0261 |
| | | | | 705/14.58 |
| 2018/0082183 | A1 * | 3/2018 | Hertz | G06K 9/6259 |

* cited by examiner

1. $\mathbf{w}_i = \begin{bmatrix} w_{i1}, ..., w_{ij}, .. w_{iM} \end{bmatrix}^T$ 2. $\mathbf{d}_i = \begin{bmatrix} d_{i1}, ..., d_{ij}, .. d_{iM} \end{bmatrix}^T$ 3. $\text{similarity} = \begin{bmatrix} w_{i1}^T d_{i1} \\ \vdots \\ w_{ij}^T d_{ij} \\ \vdots \\ w_{iM}^T d_{iM} \end{bmatrix}$

Figure 5

BASELINE INTEREST PROFILE FOR RECOMMENDATIONS USING A GEOGRAPHIC LOCATION

CROSS REFERENCE TO RELATED APPLICATION

This application claims priority to and is a continuation of U.S. application Ser. No. 15/265,777, filed on Sep. 14, 2016, entitled "Baseline Interest Profile for Recommendations Using a Geographic Location", which is incorporated herein.

BACKGROUND

Content-aggregation websites, including social-networking websites, often display content to a user using graphical user interface (GUI) functionality called a "content stream". Such websites determine inclusion or prominence of an item (e.g., an article) in the content stream based at least in part on a personalized user-interest profile which records the user's explicit (e.g., expressly identified interests) and implicit relevance feedback (e.g., clicks) as to previous items of content presented in the content stream.

However, the personalized user-interest profile for a new or infrequent user might be empty or nearly empty. This is sometimes referred to as a "cold start" problem and solving it remains an active area of research and experimentation.

SUMMARY

In an example embodiment, a processor-executed method is described. According to the method, software for a website hosting a content-aggregation service generates a first representation of interests for a geographical location. The first representation is an interest profile that includes a plurality of entities that are derived from at least one corpus of documents. Each of the plurality of entities is associated with an expected value that is based at least in part on engagement signals received by a content-aggregation service from users in the geographical location and that is weighted using a sparse-polarity approach to be discriminative with respect to other entities. Each of a plurality of ingested articles is represented by a second representation that associates an aboutness score with each of the plurality of entities. The software uses the first representation, a similarity measure, and the second representations to create rankings of the plurality of ingested articles. Then the software receives a request for access to the content-aggregation service from a new or infrequent user from the geographical location and serves the new or infrequent user a content stream based at least in part on the rankings.

In another example embodiment, an apparatus is described, namely, computer-readable media which persistently store a program for a website hosting a content-aggregation service. The program generates a first representation of interests for a geographical location. The first representation is an interest profile that includes a plurality of entities that are derived from at least one corpus of documents. Each of the plurality of entities is associated with an expected value that is based at least in part on engagement signals received from a content-aggregation service from users in the geographical location and that is weighted using a sparse-polarity approach to be discriminative with respect to other entities. Each of a plurality of ingested articles is represented a second representation that associates an aboutness score with each of the plurality of entities. The software uses the first representation, a similarity measure, and the second representations to create rankings of the plurality of ingested articles. Then the software receives a request for access to the content-aggregation service from a new or infrequent user from the geographical location and serves the new or infrequent user a content stream based at least in part on the rankings.

Another example embodiment also involves a processor-executed method. According to the method, software for a website hosting a content-aggregation service generates a first representation of interests for a city. The first representation is an interest profile that includes a plurality of entities that are derived from at least one corpus of documents. Each of the plurality of entities is associated with an expected value that is based at least in part on engagement signals received by a content-aggregation service from users in the city and that is weighted using a sparse-polarity approach to be discriminative with respect to other entities. The software uses the first representation, a similarity measure, and a second representation to create rankings of the plurality of ingested articles. Each of a plurality of ingested articles is represented by a second representation that associates an aboutness score with each of the plurality of entities. The first representation and the second representation are vectors and the similarity measure is cosine similarity. Then the software receives a request for access to the content-aggregation service from a new or infrequent user from the city and serves the new or infrequent user a content stream based at least in part on the rankings.

BRIEF DESCRIPTION OF THE DRAWINGS

FIG. 5 shows a similarity calculation using an interest vector for a city and an entity vector for an article, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
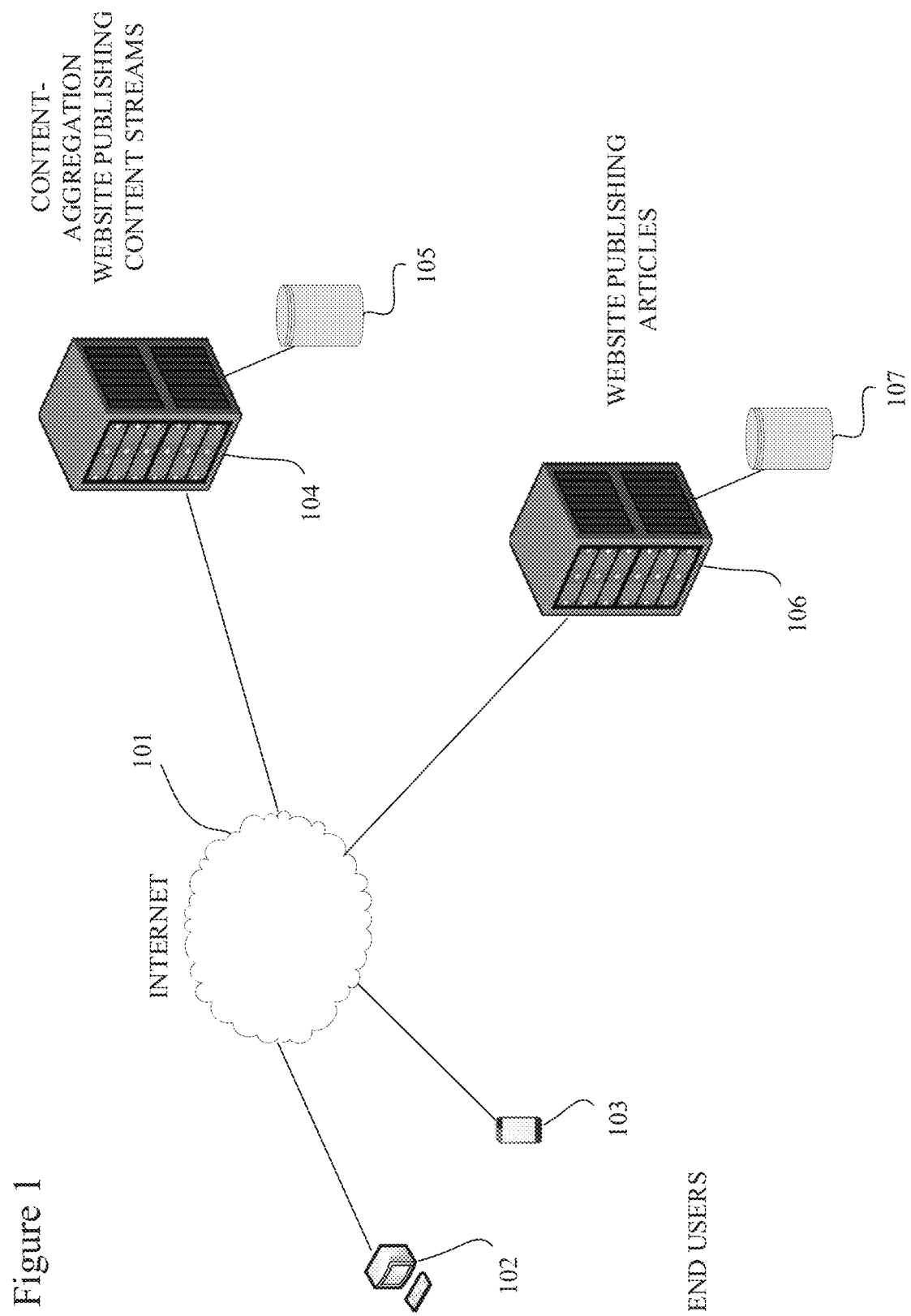
FIG. 1 is a network diagram showing a content-aggregation website, in accordance with an example embodiment.

FIG. 1 is a network diagram showing a website hosting a content-aggregation service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting a content-aggregation service that publishes a content stream and a website 106 hosting a publishing service (e.g., the website for the New York Times). In an example embodiment, website 104 might be a website such as Yahoo! News or Google News, which ingests content from the Internet through "push" technology (e.g., a subscription to a web feed such as an RSS feed) and/or "pull" technology (e.g., web crawling), including articles (or Uniform Resource Locators (URLs) for articles) from website 106.

Alternatively, in an example embodiment, website 104 might host an online social network such as Facebook or Twitter. As used here and elsewhere in this disclosure, the term "online social network" is to be broadly interpreted to include, for example, any online service, including a social-media service, that allows its users to, among other things, (a) selectively access (e.g., according to a friend list, contact list, buddy list, social graph, interest graph, or other control list) content (e.g., text including web links, images, videos, animations, audio recordings, games and other software, etc.) associated with each other's profiles (e.g., Facebook walls, Flickr photo albums, Pinterest boards, etc.); (b) selectively (e.g., according to a friend list, contact list, buddy list, social graph, interest graph, distribution list, or other control list) broadcast content (e.g., text including web links, images, videos, animations, audio recordings, games and other software, etc.) to each other's newsfeeds (e.g., content/activity streams such as Facebook's News Feed, Twitter's Timeline, Google Plus's Stream, etc.); and/or (c) selectively communicate (e.g., according to a friend list, contact list, buddy list, social graph, interest graph, distribution list, or other control list) with each other (e.g., using a messaging protocol such as email, instant messaging, short message service (SMS), etc.).

And as used in this disclosure, the term "content-aggregation service" is to be broadly interpreted to include any online service, including a social-media service, that allows its users to, among other things, access and/or annotate (e.g., comment on) content (e.g., text including web links, images, videos, animations, audio recordings, games and other software, etc.) aggregated/ingested by the online service (e.g., using its own curators and/or its own algorithms) and/or its users and presented in a "wall" view or "stream" view. It will be appreciated that a website hosting a content-aggregation service might have social features based on a friend list, contact list, buddy list, social graph, interest graph, distribution list, or other control list that is accessed over the network from a separate website hosting an online social network through an application programming interface (API) exposed by the separate website. Thus, for example, Yahoo! News might identify the content items in its newsfeed (e.g., as displayed on the front page of Yahoo! News) that have been viewed/read by a user's friends, as listed on a Facebook friend list that the user has authorized Yahoo! News to access.

In an example embodiment, websites 104 and 106 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, etc. The servers in website 104 might be connected to persistent storage 105 and the servers in website 106 might be connected to persistent storage 107. Persistent storages 105 and 107 might include flash memory, a redundant array of independent disks (RAID), and/or a storage area network (SAN), in an example embodiment. In an alternative example embodiment, the servers for websites 104 and 106 and/or the persistent storage in persistent storages 105 and 107 might be hosted wholly or partially in a public and/or private cloud, e.g., where the cloud resources serve as a platform-as-a-service (PaaS) or an infrastructure-as-a-service (IaaS).

Persistent storages 105 and 107 might be used to store content (e.g., text including web links, images, videos, animations, audio recordings, games and other software, etc.) and/or its related data. Additionally, persistent storage 105 might be used to store data related to users and their social contacts (e.g., Facebook friends), as well as software including algorithms and other processes, as described in detail below, for presenting the content (including related articles) to the users in a content stream. In an example embodiment, the content stream might be ordered from top to bottom (a) in reverse chronology (e.g., latest in time on top), or (b) according to interestingness scores. In an example embodiment, some of the content (and/or its related data) stored in persistent storages 105 and 107 might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storages 105 and 107.

Personal computer 102 and the servers at websites 104 and 106 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, global positioning system (GPS) or other location-identifying type capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by websites 104 and 106. Alternatively, users of personal computer 102 and/or mobile device 103 might use application programs (or apps, including hybrid apps that display HTML content) to access content presented by websites 104 and 106.

Figure 2:
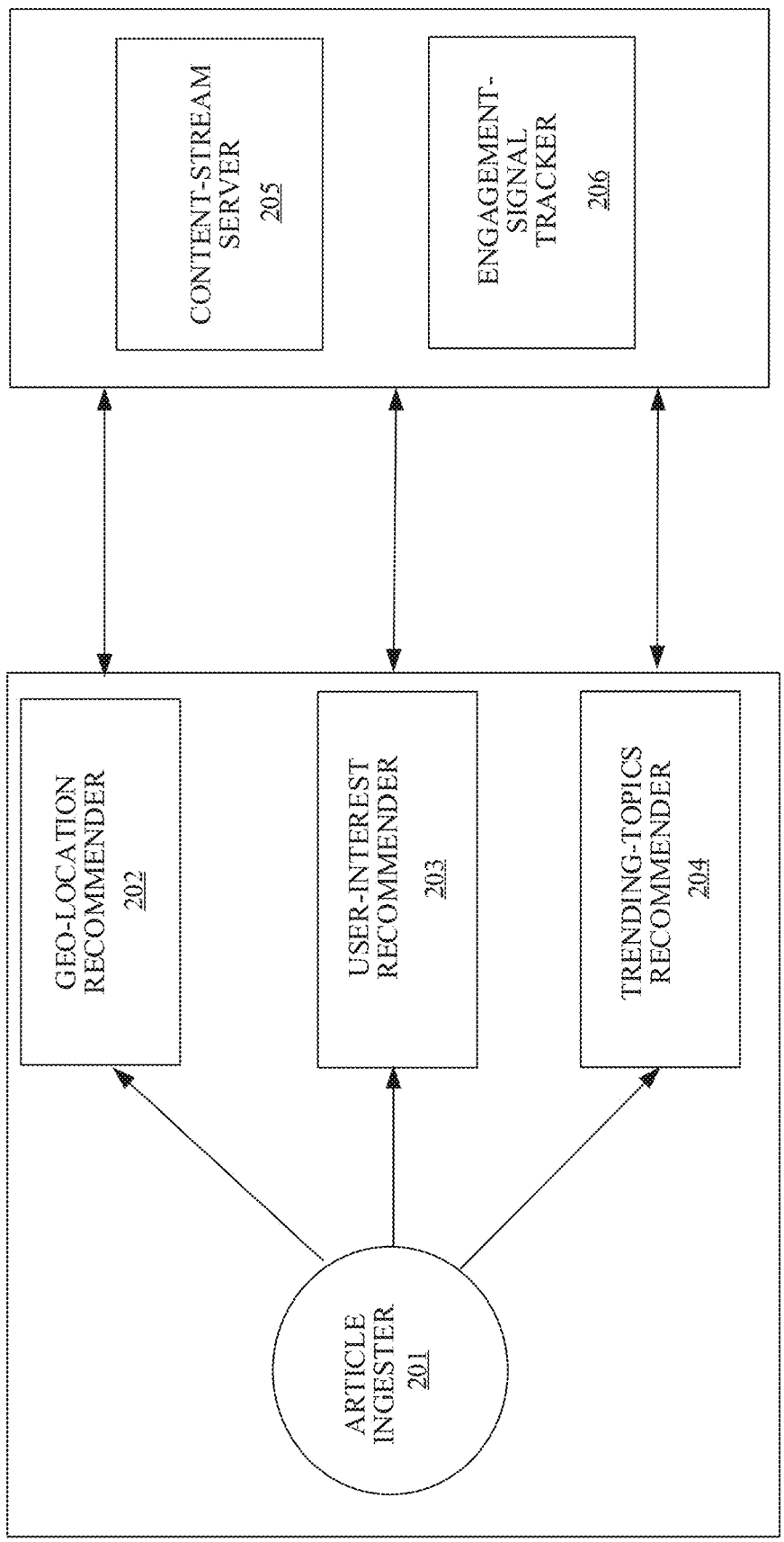
FIG. 2 shows modules at a content-aggregation website, according to an example embodiment.

FIG. 2 shows modules at a content-aggregation website, according to an example embodiment. In an example embodiment, the modules shown in this figure might be included in software running on servers at website 104 (e.g., Yahoo! News, Google News, Facebook, Twitter, etc.) using persistent storage 105. As shown in the figure, article ingester 201 might obtain articles over the Internet from publishing services (e.g., website 106) using the "push" and/or "pull" technologies described above. Article ingester 201 might then forward the articles to three different recommender modules: geo-location recommender 202, user-interest recommender 203, and trending-topics recommender 204. The geo-location recommender 202 is described above and below. In an example embodiment, the user-interest recommender might recommend articles (e.g., using similarity rankings as described above) for inclusion in the content stream of a user based on a personalized user-interest profile for the user, e.g., which records the user's expressed interests (explicit relevance feedback) and the user's past engagement signals (implied relevance feedback) with other articles presented to the user. In an example embodiment, the trending-topics recommender might recommend articles to the user based on recent real-time or near real-time engagement signals (e.g., clicks, mouse-overs, dwell time, skips, etc.) received from other users of the content-aggregation service. It will be appreciated that a "skip" might occur when a user clicks on an article prominently presented (e.g., toward the top) in a stream and then clicks on an article less prominently presented (e.g., toward the bottom) in the same stream. Any articles presented in the stream between the two clicked articles are "skipped".

The articles recommended by the three recommender systems might then be served to the user by a content-stream server 205. And in an example embodiment, engagement signal tracker 206 might then monitor the served articles for engagement signals from the user and report those signals back to each of the three recommender modules for incorporation into the module's recommender, e.g., in real-time or near real-time.

Figure 3:
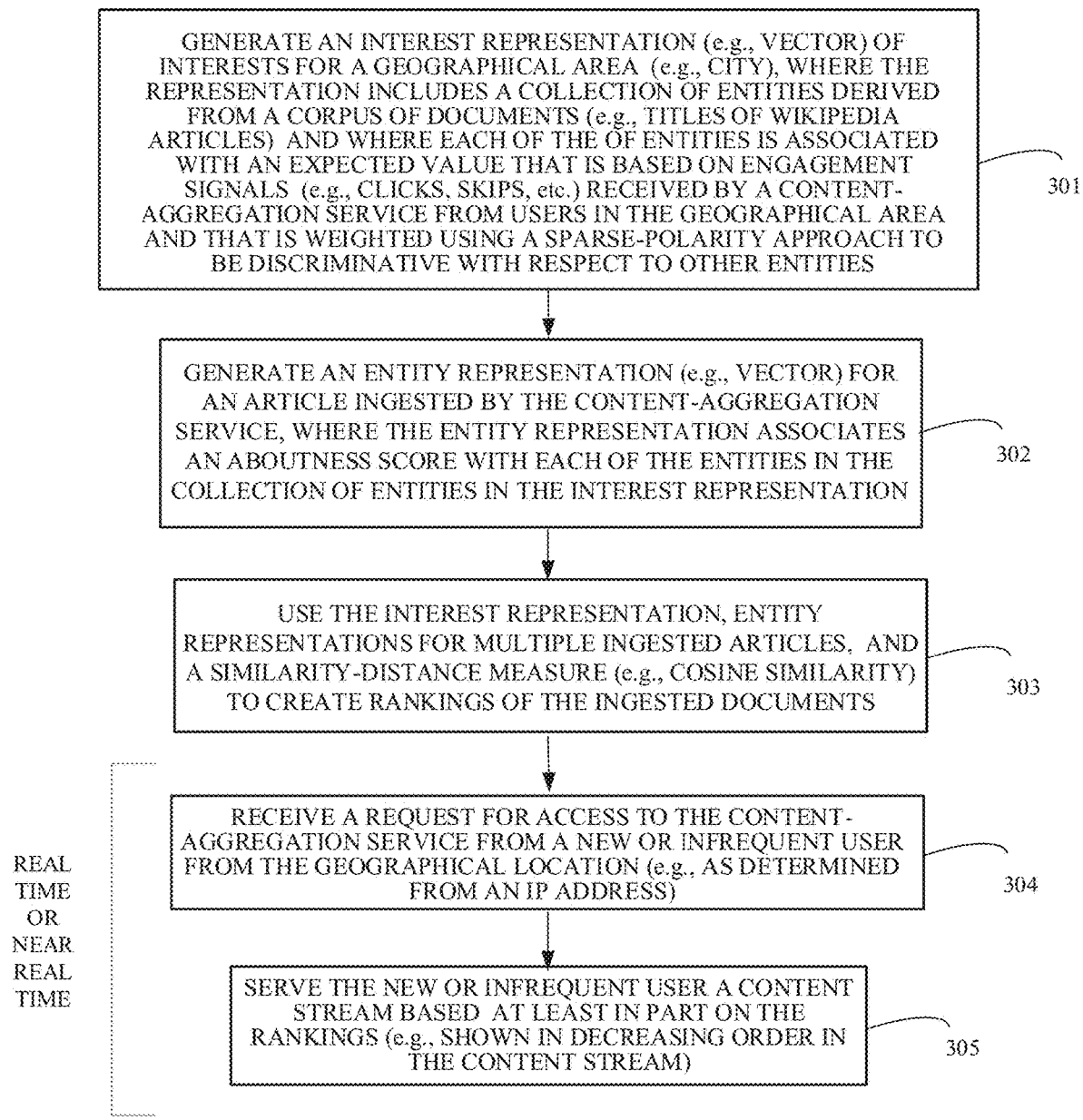
FIG. 3 is a flowchart diagram of a process for creating a baseline interest profile using a geographic location, in accordance with an example embodiment.

FIG. 3 is a flowchart diagram of a process for creating a baseline interest profile using a geographic location, in accordance with an example embodiment. In an example embodiment, the operations shown in this figure might be performed by software running on servers at website 104 (e.g., Yahoo! News, Google News, Facebook, Twitter, etc.) using persistent storage 105. In an alternative example embodiment, some of the operations shown in this figure might be performed by software (e.g., a client application including, for example, a webpage with embedded JavaScript or ActionScript) running on a client device (e.g., personal computer 102 or mobile device 103). It will be appreciated that these operations supplement the operations depicted in FIG. 2.

As depicted in FIG. 3, the software (e.g., the software running on servers at website 104) generates an interest representation (e.g., vector) of interests for a geographical location (e.g., city), in operation 301. The interest representation is an interest profile that includes a collection of entities derived from a corpus of documents (e.g., titles of Wikipedia articles) and each of the of entities is associated with an expected value (which might be normalized) that is: (1) based on engagement signals (e.g., clicks, mouse-overs, dwell time, skips, etc.) received by a content-aggregation service from users in the geographical location; and (2) that is weighted using a sparse-polarity approach to be discriminative with respect to other entities. In operation 302, the software generates an entity representation (e.g., vector) for an article ingested by the content-aggregation service. In an example embodiment, the entity representation associates a document-aboutness score, which might be normalized, with each of the entities in the collection of entities in the interest representation. In an example embodiment, "document aboutness" is defined in terms of its salient entities as described in the article by Gamon et al., "Understanding Document Aboutness Step One: Identifying Salient Entities" (Microsoft Corporation, 2013), which is incorporated herein by reference. In operation 303, the software uses the interest representation, entity representations for multiple ingested articles, and a similarity-distance measure (e.g., cosine similarity) to create rankings of the ingested documents. Then in operation 304, the software receives a request for access to the content-aggregation service from a new or infrequent user from the geographical location (e.g., as determined from an Internet Protocol (IP) address). As used in this disclosure, the term "new user" is broadly defined to include a user who has not registered with the content-aggregation service and therefore has no personalized user-interest profile. And in operation 305, the software serves the new or infrequent user a content stream based at least in part on the rankings (e.g., shown in decreasing order in the content stream).

It will be appreciated that the process described above uses content-based filtering rather than collaborative filtering, as those terms are used in the area of recommender systems. Thus, an advantage of the process described above is that it requires no collaborative exploration of new or infrequent users.

In operation 301, the software generates an interest representation for a geographical location. In an example embodiment, the type of geographical location might be a city. In another example embodiment, the type of geographical location might be a zip code or a point of interest (POI). And in another example embodiment, the type of geographical location might be a county, a state, a Nielsen Designated Market Area (DMA), or a country. Empirical research has shown that the process depicted in FIG. 3 below performs well when the geographical location is a city, relative to other types of geographical locations, e.g., states. But in other example scenarios, another type of geographical location might perform relatively better.

In an example embodiment, the software might use a sparse-polarity approach to weight the expected values in interest representation, in operation 301. The object of such an approach is to make the interest representation sparse by including in it only those entities (or features) that are specific to a geographical location and not those that are popular among all geographic areas. As used in this disclosure, the term "entity" is used interchangeably with the term "feature" and means the same thing, namely, an entity (or feature) is any person, politician, sport, city, or other object which a user of a content-aggregation service might be interested in.

A formal description of a sparse-polarity approach in the context of operation 301 is provided below. First, a background probability that an entity j will be engaged with is calculated using a formula similar to the following, where j is an entity, i is a geographical location, and n is a number of engagements (e.g., as determined from logs kept by the content-aggregation service):

$$P_{+j} = \frac{\sum_i (n_{ij})}{\sum_{ij} (n_{ij})}$$

This background probability can be interpreted as the probability someone in the general population will interact with item j. This background probability is then used to calculate an expected value for the number of engagements with an entity j in a geographical location i using a formula similar to the following:

$$e_{ij} = P_{+j} \sum_j (n_{ij})$$

This expected value can be interpreted as the expected number of engagements with entity j in geographical location i, assuming the geographical location i does not deviate from the general population. This expected value is then used to calculate an affinity score for the entity j in a geographical location i, using a formula similar to the following, where k is a chi-squared smoothing parameter:

$$\lambda_{ij} = \frac{n_{ij} + k}{e_{ij} + k}$$

Ignoring the smoothing parameter, it can be seen that the affinity score represents a comparison between the actual number of engagements with entity j in geographical location i and the expected number of such engagements based on the probability for the general population.

This affinity score is then used to remove entities which have affinity scores that are not significantly higher than that of the general population. More specifically, the affinity score for the entity j in geographical location i is used to calculate a z-statistic using a formula similar to the following, where the log-normalized affinity score is divided by the standard deviation represented by the lowercase sigma:

$$z = \frac{|\log(\lambda_{ij})|}{\sigma}$$

Then the z-statistic is used to determine a final affinity score using a formula similar to the following:

$$\text{score} = (z > 1)? \log(\lambda_{ij}) : 0$$

From this formula, it can be seen that if z is greater than one, then the final affinity score is the log of the affinity score, whereas if z is not greater than one, the final affinity score is zero, which effectively eliminates the entity j from the interest representation for the city i.

In an example embodiment, the final affinity score might be further weighted using a Laplace smoothing parameter in order to give greater importance to entities that were engaged with (e.g., clicked) more than skipped.

It will be appreciated that the above calculations as to final affinity score might be performed in parallel for every geographic location i, e.g., using Map-Reduce functionality. Also, in another example embodiment, gender or age might be the i used in the calculations.

In operation 301, the software generates an interest representation that might be a vector and, in operation 302, the software generates an entity representation that might also be a vector. It will be appreciated that the use of vectors as representations determines to some extent the similarity-distance measure in operation 303, e.g., cosine similarity (which might reduce to an inner-product vector calculation when the values in each vector are normalized). In another example embodiment, the software might generate an interest representation and an entity representation that are sets (or "bags of words") and the software might use a corresponding similarity-distance measure, e.g., Jaccard similarity. In yet another example embodiment, the software might use some other similarity-distance measure and corresponding representations, e.g., a Euclidean similarity-distance measure or a City Block similarity-distance measure.

Also, in operation 301, the interest representation includes a collection of entities derived from a corpus of documents (e.g., titles of Wikipedia articles). In an example embodiment, the collection of entities might be derived from some other corpus of documents or from a content taxonomy. In this regard, Yahoo! maintains a hierarchical taxonomy, called the Yahoo! Content Taxonomy (YCT), whose parent and child nodes are content categories. In such an example embodiment, the interest representation might be a vector of entities derived from YCT, where each entity is associated with a membership score that is analogous to a document-aboutness score. And each entity representation might also be a vector of entities derived from YCT, where each entity is associated with a membership score.

In operation 304 above, the software determines the geo-location/geo-position of a new or infrequent user using, e.g., an Internet Protocol (IP) address. In another example embodiment, the software might determine the geo-location/geo-position of a new or infrequent user using mobile-device technology, e.g., a global-positioning system (GPS), a Wi-Fi system, a cell-tower triangulation system, or a hybrid-positioning system.

As indicated in FIG. 3, operations 304 and 305 might be performed in real-time or near real-time, e.g., using streaming functionality. In an example embodiment, that streaming functionality might be a distributed streaming platform that is integrated with a distributed computing framework such as YARN. It will be appreciated that YARN is in the Hadoop family of software but includes functionality for handling distributed computations that are not structured as batch jobs for Map-Reduce processing, including distributed computations that are streaming. Also, in an example embodiment, the distributed computing framework might be supported by distributed storage, which might be Hadoop Distributed File System (HDFS), in an example embodiment. And the distributed computing framework and distributed storage might run on a networked cluster of servers (e.g., commodity servers) or other hardware computation units (e.g., the hardware computation units emanating from Facebook's Open Compute Project).

Also, in an example embodiment, the interest representation (or interest profile) might be generated offline by the software using logs that record the engagement signals of the content-aggregation service's users with the entities in the articles served by the content-aggregation service over a period of time (e.g., six months). In the same example embodiment, the interest representation might be updated by the software on a periodic basis (e.g., weekly) to reflect new engagement signals received during a period (e.g., a week). In another example embodiment, the interest representation might be updated in real-time or near real-time, e.g., using the streaming functionality described above.

Figure 4:
FIG. 4 shows a content stream presented by a content-aggregation website, in accordance with an example embodiment.

FIG. 4 shows a content stream presented by a content-aggregation website, in accordance with an example embodiment. In an example embodiment, the content stream might be generated by the content stream server 205 in FIG. 2. As depicted in FIG. 4, content stream 401 includes two full articles (402 and 403) arranged vertically in order of prominence from top to bottom in accordance with recommender rankings (e.g., with the highest-ranking article at the top and the lowest-ranking article at the bottom). Content stream 401 also includes four thumbnail articles (404, 405, 406, and 407) arranged horizontally and an ad 408 labeled "Sponsored". Displayed outside the content stream 401 are trending topics 409, which might be generated by trending-topics recommender 204 in FIG. 2. It will be appreciated that trending-topics recommender 204 might reflect short-term interests of users, whereas the geo-location recommender 202 and the user-interest recommender 203 reflect long-term interests of users.

In an example embodiment, one or more of the full articles and/or one or more of thumbnail articles might have been recommended using the process described in FIG. 3, e.g., as performed by geo-location recommender 202 in FIG. 2. Additionally, in the same example embodiment, one or more of the full articles and/or one or more of thumbnail articles might have been recommended by the user-interest recommender 203 in FIG. 2. As described above, the latter recommender might use a personalized user-interest profile for a user, e.g., which records the user's expressed interests (explicit relevance feedback) and the user's past engagement signals (implied relevance feedback) with other articles presented to the user. Such a user might not ordinarily be a new or infrequent user within the description of FIG. 3. However, it will appreciated that in a an example scenario, the geo-location recommender 202 might be used to show a user entities that extend beyond those recorded in the user's personalized user-interest profile, e.g., as part of "explore-exploit" presentation to maintain the user's interest. In this regard, see Argawal et al., *Explore/Exploit Schemes for Web Content Optimization*, Ninth IEEE International Conference on Data Mining 2009 (ICDM '09) (hereinafter "Explore/Exploit Schemes"), which is incorporated herein by reference.

In an example embodiment, the geo-location recommender 202 in FIG. 2 might be trained (or learned) using the following approach. The T training data points are given as a set of triplets $$\left\{ X_t \triangleq (d_l, a_i, y_t) \mid y_t = \pm 1,\ l \in [P],\ i \in [N] \right\} \text{ for } t \in [T],$$

where $d_l$ denotes one of the P geo-entities (for e.g., city, state, country) where this interaction happened, $a_i$ is one of the N article (or content) and $y_t=+1$ denotes a click while $y_t=-1$ denotes a skip.

Let there be a total of $M_{wiki}$ Wiki entities that includes names of individuals, events, cities, important locations, etc., along with $M_{cat}$ broad YCT categories such as politics, humor, etc. Each article can be related to multiple Wikis or YCTs. For instance, a given article might be associated with Wikis Donald Trump, Elections, White_House and the corresponding YCTs Politics, News etc. Each article is denoted with a $M=M_{wiki}+M_{cat}$ dimensional feature (or entity) vector encoding the entities and categories associated with it, where each index represents a particular Wiki (or YCT) and the corresponding value denotes the aboutness score (e.g., document-aboutness score) of the article to this feature. It will be appreciated that there are two types of features (or entities) encoded by this vector: Wiki and YCT. The aboutness score is an element of [0; 1] of any feature (or entity) for an article defines the magnitude of the relation between the feature (or entity) and the article, 0 being completely unrelated and 1 being highly related. The aboutness score is thresholded, with small values mapped to 0. Since a given article can only be associated with a few entities (or features) and categories, the vector representation is sparse.

Each article is tagged with a set of associated entities and categories during ingestion so that every article is a M-dimensional vector of aboutness scores of features. That is, the article $a_i$, where i is an element of [N] is represented as a sparse vector $w_i = [w_{i1}, \ldots, w_{ij}, \ldots, w_{iM}]^T \in \mathbb{R}^M$, where $w_{ij}$ denotes the aboutness score of feature j to article i. Let there be $M_i$ features with the aboutness score greater than 0 associated with the i$^{th}$ article. Under this formulation, the t$^{th}$ training datum $X_t$ can now be written as $$(d_l, w_i, y_t) \triangleq (d_l, [w_{i1}, \ldots, w_{ij}, \ldots, w_{iM}]^T, y_t)$$

which can further be flattened into a set of $M_i$ individual geo-entity and feature interaction data points as $$(d_l, w_i, y_t) \triangleq$$

$$(d_l[w_{i1}, \ldots, w_{ij}, \ldots, w_{iM}]^T, y_t) \triangleq \{(d_l, w_{ij}, y_t) \mid j \in [M],\ w_{ij} > 0\}$$

Overall, since each article is represented as a set of features, the indexing for the article itself can be removed and the given training data can be considered as a set of interactions between a geo-entity (e.g., a geographic location) and a feature along with corresponding click/skip label. In this formulation, the training data is denoted as $$X_{tr} = \{(d_i, w_j, y_t) | i \in [P], j \in [M]\}$$

for $t \in [T]$, where total number of training examples T now denotes the total number of geo-entity and feature interaction data available for training. A snapshot of hypothetical training data involving cities and Wikis/YCTs is shown below:
{(santa-clara, apple:0.35, 1), (santa-clara, news:0.70, 1), (denver, facebook:0.90, −1), (chicago, google: 0.43, 1), ... }
where apple: 0.35 denotes the Wiki entity apple with aboutness score 0.35.

For each geo-entity indexed by i, where i is an element of [P], a M-dimensional interest profile is constructed $$d_i = [d_{i1}, \ldots, d_{ij}, \ldots, d_{iM}]^T$$

such that $d_{ij}$ represents the affinity of geo-entity i towards feature j. For instance, if it is assumed that users in general are interested in technology-related entities in the San Francisco bay area, then large values for those entities will occur in the San Francisco profile.

The following table sets forth the notation that is used to formally describe the sparse-polarity framework which is employed to include only those features which are specific to the geo-entity and not those that are popular among all geo-entities, so that a specific and sparse interest profile is constructed for each geo-entity.

| Notation | Description |
|---|---|
| type(j) | type of $j^{th}$ feature - Wiki or YCT |
| $N_{i,j}^{\pm}$ | for $i^{th}$ geo-entity and $j^{th}$ feature the sum of the aboutness scores |
| $N_{i,j}^{+}$ | for $i^{th}$ geo-entity and $j^{th}$ feature the sum of the aboutness scores when it was clicked |
| $N_{:,j}^{+}$ | the sum of the aboutness score when $j^{th}$ feature was clicked over all geo-entities |
| $N_{i,type(j)}^{+}$ | for $i^{th}$ geo-entity, the sum of the aboutness score of all the features of type(j) when clicked |
| $N_{:,type(j)}^{+}$ | the sum of the aboutness score of all the features of type(j) when clicked over all geo-entities |
| $N_{:,:}^{\pm}$ | the sum of the aboutness score of all the features over all geo-entities |
| $N_{:,:}^{+}$ | the sum of the aboutness score of all the features when clicked over all geo-entities |
| K | Chi-squared smoothing parameter |
| τ | significance threshold for the z-statistics |

For each feature j, the fraction of its aboutness score is computed with respect to the total aboutness score accumulated by all features of this type:

$$P_{:,j}^{+} = \frac{N_{:,j}^{+}}{N_{:,type(j)}^{+}}$$

For each geo-entity i, the average (expected) aboutness score accumulated by entity j is computed as $$\mathbb{E}_{i,j} = N_{i,type(j)}^{+} \times P_{+,j}$$

Then the following quantities are computed:

$$\eta_{i,j} = \frac{1}{\mathbb{E}_{i,j} + K}$$

$$\lambda_{i,j} = (N_{i,j}^{+} + K) * \eta_{i,j}.$$

The quantity $\lambda_{i,j}$ is a ratio of accumulated aboutness score of feature j in geo-entity i as compared to the average aboutness score accumulated by features of type(j).

In order to determine if the aboutness score of feature j in geo-entity i is significantly larger than the expected value, a z-statistic is formulated and used to see if it is bigger than a given significance threshold. The z-statistic is computed as $$z_{i,j} = \frac{|\log(\lambda_{i,j})|}{\sqrt{\eta_{i,j}}}.$$

The z-statistic is then compared with a significance threshold tau to compute the intermediate score for feature j and geo-entity i as $$s_{i,j} = (z_{i,j} > \tau)?\log(\lambda_{i,j}):0$$

where $s_{i,j} = \log(\lambda_{i,j})$ if $(z_{i,j} > \tau)$ and 0 otherwise.

Next these scores are further weighted in order to give larger importance to features that are clicked more than skipped. The weight is computed as $$\delta_{i,j} = \frac{(N_{i,j}^{+} + L \cdot N_{:,:}^{+})}{(N_{i,j}^{\pm} + L \cdot N_{:,:}^{\pm}) \times \left(\frac{N_{:,:}^{+}}{N_{:,:}^{\pm}}\right)}$$

Where L≥0 is a Laplace smoothing parameter.

The final interest profile values are computed as:

$$d_{i,j} = \delta_{i,j} \cdot s_{i,j}.$$

Below is a table showing the learned interest profiles resulting from software trained (or learned) as described above for several cities around the world:

| City: Country | Top Profile Feature |
|---|---|
| Neral: India | Salman_Khan, Shah_Rukh_Khan, Kapil_Sharma, Comedy_Nights_with_Capil, Rohit_Sharma, Virat_Kohli, Malaika_Arora_Khan, Mahendra_Singh_Dhoni, Bollywood, Maharashtra, Melbourne_Cricket_Ground, Bharatiya_Janata_Party, Narendra_Modi, . . . |
| San Francisco: USA | South_of_Market, Mission_District, Transbay_Tube, Van_Ness_Avenue, Golden_State_Warriors, Shasta_Ventures, Matt_Nieto, Salesforce, Juan_Marichal, Dontae_Johnson, Matt_Winn, Adam_Messinger, Marissa_Mayer, Apple, . . . |
| Wyong: Australia | Sydney, Bec_Hewitt, Tony_Abbott, Malcom_Turnbull, Queensland, Melbourne, Samantha_Armytage, Melbourne_Cup, Keith_Stewart, Gerry_Harvey, Roger_Federer, David_Warner, Novak_Djokovic, Robbie_Williams, Russel_Crowe, Australian_Open, Andy_Murray, . . . |

Empirical testing of the trained (or learned) software described above has shown statistically-significant improvement in user engagement (e.g., clicks) with the content stream served to new or infrequent users.

FIG. 5 shows a similarity calculation using an interest vector for a city and an entity vector for an article, in accordance with an example embodiment. As depicted in this figure, vector $w_i$ (1 in this figure) is an interest vector for a geographical location, where the values $w_{i1}$, $w_{ij}$, etc., are weighted expected values for entities 1, j, etc. Vector $d_i$ (2 in this figure) is an entity vector, where the values $d_{i1}$, $d_{ij}$, etc. are document-aboutness scores for the entities 1, j, etc. The similarity (3 in this figure) between the interest vector and each entity vector representing an ingested article is the scalar resulting from the inner product of (1) and (2).

Figure 6:
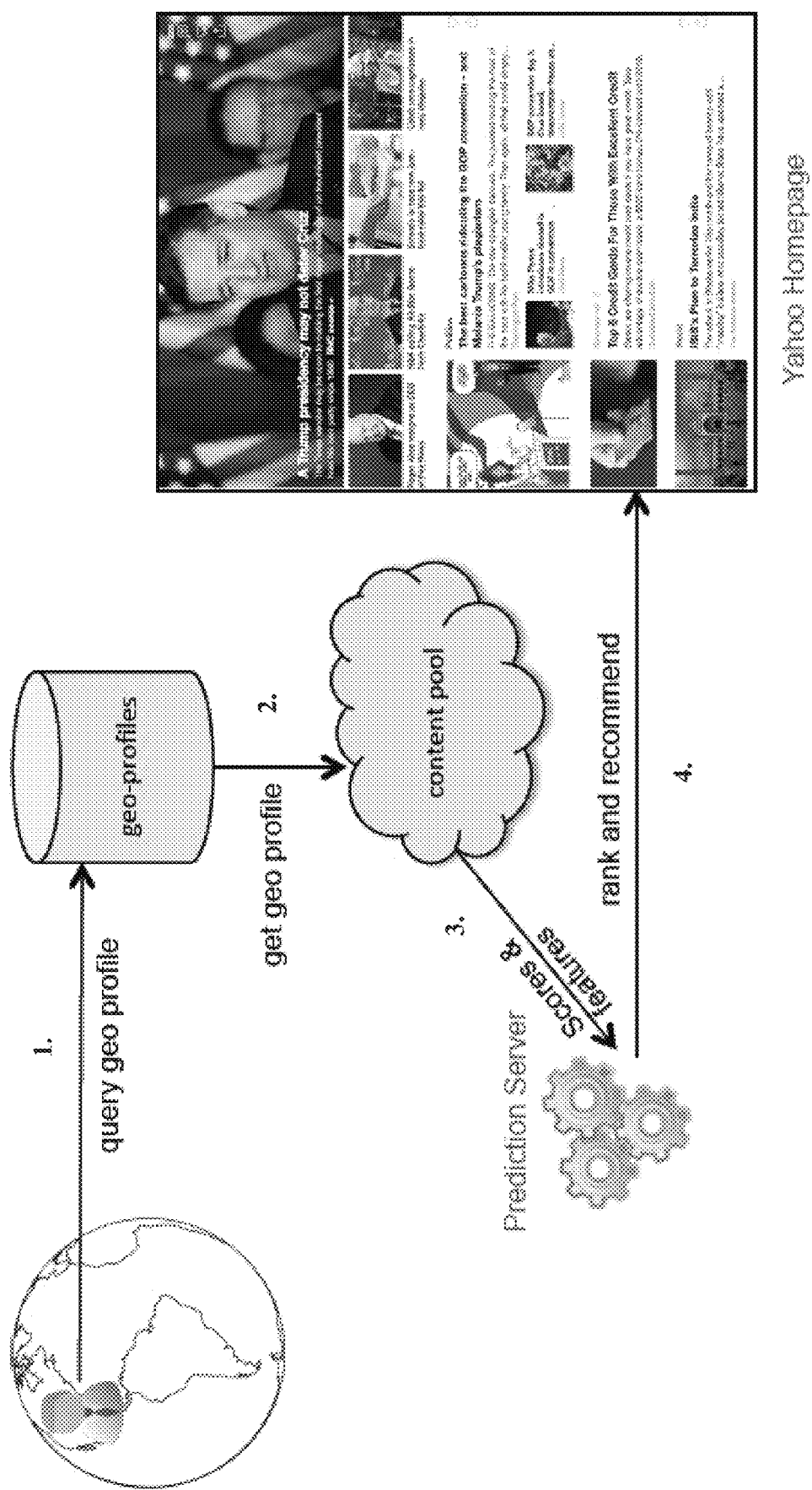
FIG. 6 is a sequence diagram for generating a content stream at a content-aggregation website, in accordance with an example embodiment.

FIG. 6 is a sequence diagram for generating a content stream at a website hosting a content-aggregation service, in accordance with an example embodiment. In an example embodiment, the operations shown in this figure might be performed by software running on servers at website 104 (e.g., Yahoo! News, Google News, Facebook, Twitter, etc.) using persistent storage 105. In an alternative example embodiment, some of the operations shown in this figure might be performed by software (e.g., a client application including, for example, a webpage with embedded JavaScript or ActionScript) running on a client device (e.g., personal computer 102 or mobile device 103).

In operation 1, software (e.g., at website 104) queries persistent storage (e.g., persistent storage 105 identified as "geo-profiles") for a baseline interest profile (or interest profile) for a geographical location ascertained for a new or infrequent user of a content-aggregation service. And in operation 2, the software receives the baseline interest profile, which might be represented as a vector of expected values for user engagement with a collection of entities (e.g., derived from the titles of Wikipedia articles). Then in operation 3, the software determines the degree of similarity between the baseline interest profile and an entity representation for all of the articles previously ingested from publishing services (e.g., website 106 identified as "content pool") by the content-aggregation service over the Internet. In an example embodiment, each of the articles might be represented by a vector of "document aboutness" scores for the collection of entities. In operation 4, the software (e.g., identified as "Prediction Server") ranks the articles on the basis of similarity and uses the rankings to serve the articles to the new or infrequent user in a content stream (e.g., the Yahoo Homepage). In an example embodiment, the most similar articles might be served in the most prominent position in the content stream, e.g., at the top of the content stream.

With the above embodiments in mind, it should be understood that the present disclosure might employ various computer-implemented operations involving data stored in computer systems. Any of the operations described herein that form part of the present disclosure are useful machine operations. The present disclosure also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The present disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the present disclosure have been described in some detail for purposes of clarity of understanding, it will be apparent that certain changes and modifications can be practiced within the scope of the following claims. For example, gender and/or age might be used to build the interest representation, rather geographic location. Moreover, the operations described above can be ordered, modularized, and/or distributed in any suitable way. Accordingly, the present embodiments are to be considered as illustrative and not restrictive, and the present disclosure is not to be limited to the details given herein, but may be modified within the scope and equivalents of the following claims. In the following claims, elements and/or steps do not imply any particular order of operation, unless explicitly stated in the claims or implicitly required by the disclosure.

The invention claimed is:

1. A method, comprising:
   generating a first representation of interests for a geographical location, wherein the first representation includes a plurality of entities that are derived from at least one corpus of documents and wherein each entity of the plurality of entities is associated with an expected value that is based at least in part on engagement signals received by a content-aggregation service from one or more users in the geographical location and that is weighted using a sparse-polarity approach to be discriminative with respect to other entities, wherein one or more entities of the plurality of entities are labels derived from the at least one corpus; and using the first representation, a similarity measure, and a second representation to create rankings of a plurality of ingested articles, wherein each ingested article of the plurality of ingested articles is represented by the second representation that associates an about score from each entity of the plurality of entities.

2. The method of claim 1, wherein the geographical location is a city.

3. The method of claim 1, wherein the first representation and the second representation are vectors.

4. The method of claim 1, comprising an operation of updating the plurality of entities with new signals in real-time or near-real-time, using stream processing.

5. The method of claim 1, wherein the similarity measure is cosine similarity.

6. The method of claim 1, wherein the labels are nodes in a taxonomy created at least in part from documents previously ingested by the content-aggregation service.

7. The method of claim 1, wherein the expected value reflects a conditional probability of a positive user engagement with an entity, given the geographical location.

8. The method of claim 1, wherein the geographical location is determined from an internet-protocol (IP) address.

9. The method of claim 1, wherein the sparse-polarity approach involves application of a threshold to a z-statistic.

10. One or more computer-readable media that are non-transitory and that store a program, wherein the program, when executed, instructs a processor to perform the following operations:

generate a first representation of interests for a geographical location, wherein the first representation includes a plurality of entities that are derived from at least one corpus of documents and wherein each entity of the plurality of entities is associated with a probability score that is based at least in part on engagement signals received from one or more users in the geographical location, wherein one or more entities of the plurality of entities are labels derived from the at least one corpus;

use the first representation, a similarity measure, and a second representation to create rankings of a plurality of ingested articles received by a content-aggregation service, wherein each ingested article of the plurality of ingested articles is represented by the second representation that associates an about score from each entity of the plurality of entities;

receive a request for access to the content-aggregation service from a new or infrequent user from the geographical location; and serve the new or infrequent user a content stream based at least in part on the rankings.

11. The one or more computer-readable media of claim 10, wherein the geographical location is a city.

12. The one or more computer-readable media of claim 10, wherein the first representation and the second representation are vectors.

13. The one or more computer-readable media of claim 10, comprising an operation of updating the plurality of entities with new signals in real-time or near-real-time, using stream processing.

14. The one or more computer-readable media of claim 10, wherein the similarity measure is cosine similarity.

15. The one or more computer-readable media of claim 10, wherein the labels are nodes in a taxonomy created at least in part from documents previously ingested by the content-aggregation service.

16. The one or more computer-readable media of claim 10, wherein each entity of the plurality of entities is associated with an expected value, wherein the expected value reflects a conditional probability of a positive user engagement with an entity, given the geographical location.

17. The one or more computer-readable media of claim 10, wherein the geographical location of the new or infrequent user is determined from an internet-protocol (IP) address associated with the new or infrequent user.

18. The one or more computer-readable media of claim 10, comprising an operation of applying a threshold to a z-statistic.

19. A method, comprising:

generating a first representation of interests for a city, wherein the first representation includes a plurality of entities that are derived from at least one corpus of documents and wherein each entity of the plurality of entities is associated with an expected value that is based at least in part on engagement signals received by a content-aggregation service from one or more users in the city, wherein one or more entities of the plurality of entities are labels derived from the at least one corpus; and using the first representation, a similarity measure, and a second representation to create rankings of a plurality of ingested articles, wherein each ingested article of the plurality of ingested articles is represented by the second representation that associates an about score from each entity of the plurality of entities and wherein the first representation and the second representation are vectors and the similarity measure is cosine similarity.

20. The method of claim 19, wherein the city is determined from an internet-protocol (IP) address.

* * * * *